United States Patent
Chang et al.

(10) Patent No.: US 10,541,606 B1
(45) Date of Patent: Jan. 21, 2020

(54) SERIAL-PARALLEL SWITCH NEGATIVE CHARGE PUMP

(71) Applicant: Taiwan Semiconductor Manufacturing Company, Ltd., Hsinchu (TW)

(72) Inventors: Yen-An Chang, Hsinchu (TW); Yi-Chun Shih, Hsinchu (TW)

(73) Assignee: Taiwan Semiconductor Manufacturing Company, Ltd. (TW)

( * ) Notice: Subject to any disclaimer, the term of this patent is extended or adjusted under 35 U.S.C. 154(b) by 0 days.

(21) Appl. No.: 16/220,006

(22) Filed: Dec. 14, 2018

Related U.S. Application Data (60) Provisional application No. 62/698,932, filed on Jul. 16, 2018.

(51) Int. Cl.
  *H02M 3/07*  (2006.01)
  *H02M 3/18*  (2006.01)

(52) U.S. Cl.
  CPC ........ *H02M 3/07* (2013.01); *H02M 2003/071* (2013.01)

(58) Field of Classification Search
  CPC ............................ H02M 3/07; H02M 2003/071
  See application file for complete search history.

(56) References Cited

U.S. PATENT DOCUMENTS

| | | | | |
|---|---|---|---|---|
| 7,884,665 B2* | 2/2011 | Saikusa | ................. | H02J 7/0044 307/110 |
| 8,044,707 B2* | 10/2011 | Saman | .................... | H02M 3/07 327/536 |
| 8,310,218 B2* | 11/2012 | Williams | ................. | H02M 3/07 323/265 |
| 9,065,392 B2* | 6/2015 | Myles | ........................ | H03F 3/21 |
| 2008/0150620 A1* | 6/2008 | Lesso | ...................... | H02M 3/07 327/536 |

* cited by examiner

*Primary Examiner* — Kenneth B Wells
(74) *Attorney, Agent, or Firm* — Merchant & Gould P.C.

(57) ABSTRACT

A negative charge pump includes a network of two or more capacitors, and switches and adapted to switch the capacitor network between a serial configuration, in which the capacitors are connected to each other in series, and a parallel configuration, in which the capacitors are connected to each other in parallel. The negative charge pump has an input adapted to receive an input signal having intermittent high- and low levels, and an output. The switches are adapted to switch the capacitor network into the serial configuration when the input signal is high and switch the switch the capacitor network into the parallel configuration when the input signal is low (e.g., zero or ground level). A method of converting a positive voltage to a negative voltage includes applying an input signal having intermittent high- (e.g., positive-) and low (e.g., zero or ground) levels to a capacitor network having two or more capacitors; configuring the network into a serial configuration, in which the capacitors are connected to each other in series; charging the capacitors connected in series with the input signal during a pre-charge period, during which the input signal level is high; subsequently, during a pump period, during which the input signal level is low, configuring the network into a parallel configuration, in which the capacitors are connected to each other in parallel; and discharging the capacitors connected in parallel to an output.

18 Claims, 11 Drawing Sheets

SERIAL-PARALLEL SWITCH NEGATIVE CHARGE PUMP

BACKGROUND

This disclosure relates generally to charge pumps and related methods of voltage generation. This disclosure more specifically relates to charge pumps and methods for generating a negative voltage.

Charge pumps and related methods find significant applications in electronic devices. Negative charge pumps and methods, i.e., charge pumps and methods for generating voltage levels lower than the ground level can be useful. For example, in certain low-power memory devices, it may be advantageous to bias the substrate of the memory with a negative voltage to reduce leakage current. As power or current consumption is a significant consideration in designing certain electronic devices, efforts continue in making devices with efficient negative charge pumps.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

This disclosure pertains to charge pumps, which are utilized in a variety of devices. Charge pumps can function as power converters, such as DC-DC converters, with relatively simple components and occupying relatively small spaces. Negative charge pumps, i.e., charge pumps that generate voltages more negative than ground potential, are useful in many applications. For example, in certain low-power memory devices, negative charge pump can be used to apply a negative bias to the substrate to reduce leakage current.

For certain applications, such as low-power memory application, it is advantageous to have a high efficiency, such as current efficiency (i.e., a ratio between the output current and input current of the charge pump). Traditional negative charge pumps often have poor current efficiency, such as 50% or less. Low current efficiency results in a higher current consumption, which is undesirable for low-power memory applications.

The negative charge pumps disclosed herein according to some embodiments achieve higher current efficiency, e.g., 67% or higher, by switching multiple capacitors (sometimes known as "flying capacitors") alternately into serial interconnection and parallel interconnection, and charging the capacitors in series and discharging the capacitors in parallel.

Figure 1A:
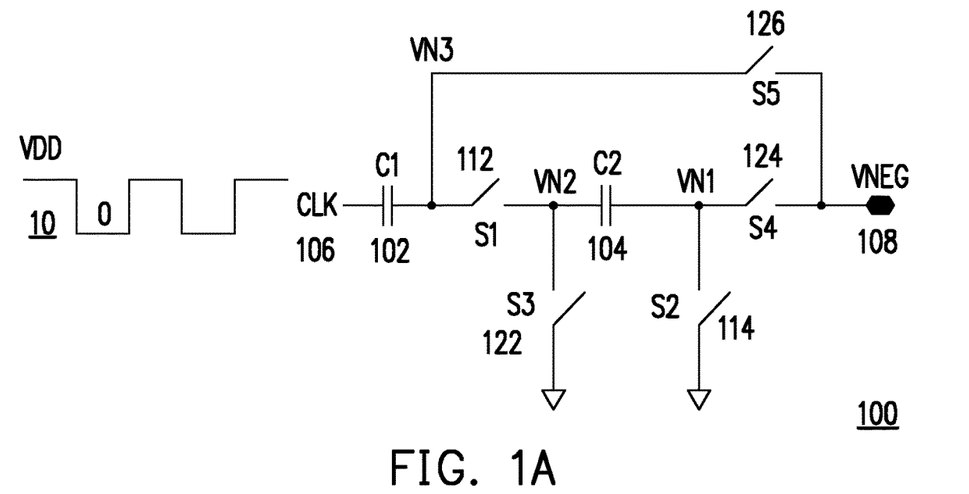
FIG. 1A shows a schematic diagram of a negative charge pump in accordance with some embodiments.

With reference to FIG. 1A, according to an embodiment, a negative charge pump (100) includes a first flying capacitor C1 (102) and a second flying capacitor C2 (104) and an input (106) and output (108). The input (106) is connected to the first capacitor C1 (102) and adapted to receive an input signal (10), which in this example is a clock signal (CLK) oscillating between a high level, which can be a positive voltage (VDD), and a low level, which in this example is ground level, or zero.

The negative charge pump (100) further includes a number of switches S1-S5, which can be switching transistors, such as field effect transistors, such as complementary metal-oxide-semiconductor (CMOS) devices. Two of the switches, S1 (112) and S2 (124), when conducting, serve to connect the flying capacitors C1 and C2 in series between the input (106) and the ground (or more generally, a voltage reference point) to charge the capacitors during a pre-charge period. The remaining switches, S3 (122), S4 (124) and S5 (126), when conducting, serve to connect the capacitors C1 and C2 in parallel between ground and the output (108) to discharge the capacitors to the output (108) during a pump period.

Figure 1B:
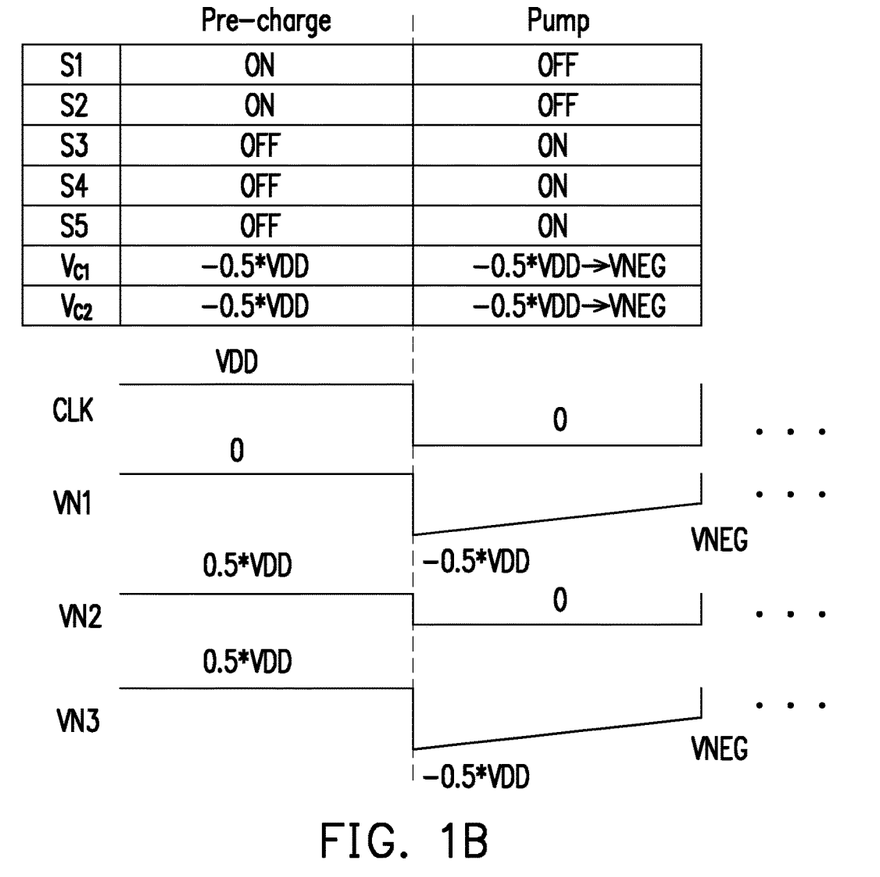
FIG. 1B shows the time progression of the clock pulse and voltages at various points in the negative charge pump shown in FIG. 1A in accordance with some embodiments.
Figure 1C:
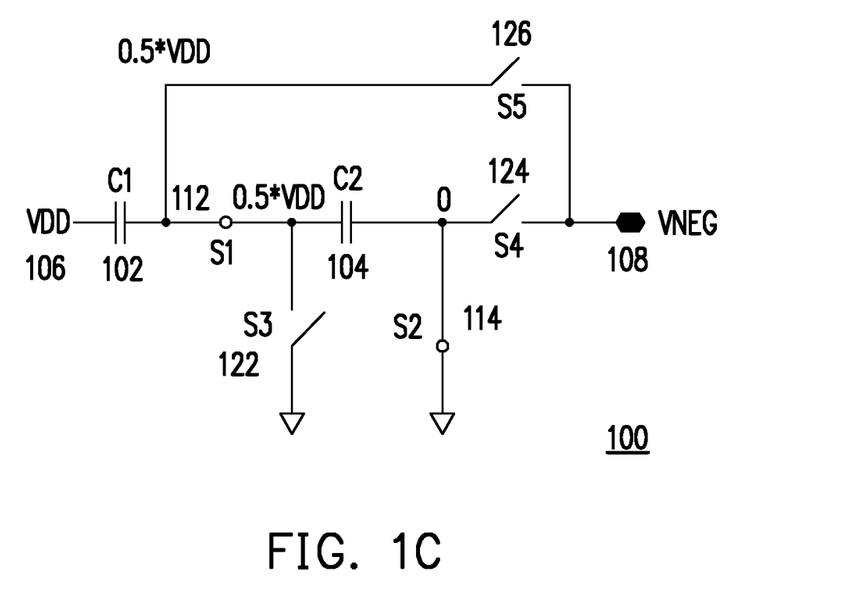
FIG. 1C shows the negative charge pump shown in FIG. 1A switched to its pre-charge state in accordance with some embodiments.

As shown in FIG. 1C, during the pre-charge period, the signal level at the input (106) is high (VDD), switches S1 and S2 are conducting (closed), and switches S3-S5 are non-conducting (open). Thus, flying capacitors C1 and C2 are charged in series at a voltage of VDD.

Figure 1D:
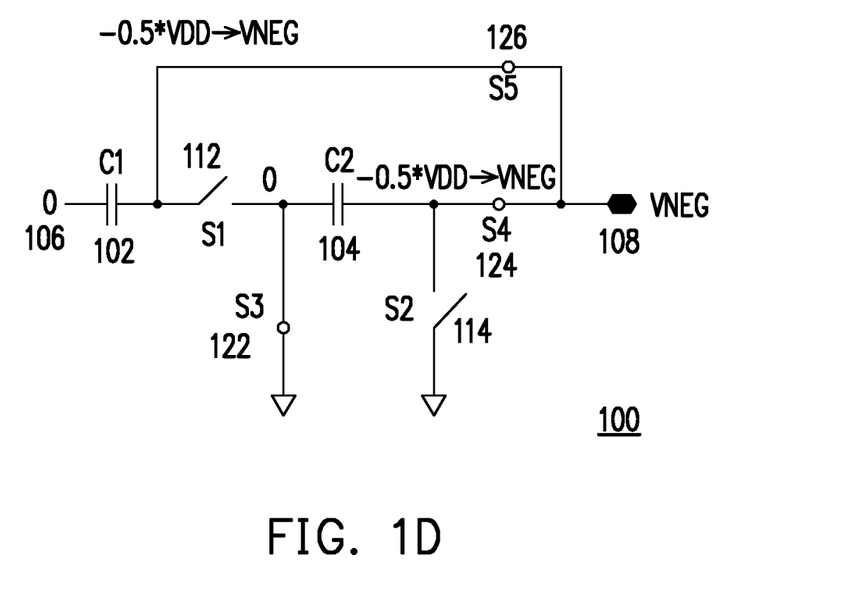
FIG. 1D shows the negative charge pump shown in FIG. 1A switched to its pump state in accordance with some embodiments.

During the pump period, as shown in FIG. 1D, the signal level at the input (106) is low (0), switches S1 and S2 are non-conducting (open), and switches S3-S5 are conducting (closed). Thus, flying capacitors C1 and C2 are connected to each other in parallel and discharge to the output 108 at a negative voltage, initially of −0.5*VDD (assuming the capacitances of C1 and C2 are equal and have a capacitance of C) and decreasing in magnitude to a voltage VNEG (having a negative value).

The cycle of pre-charge and pump periods repeats itself, maintaining at the output (108) a negative voltage of VNEG or lower (more negative). The clock signal (CLK) and the voltage at various nodes of the negative charge pump (100) for one cycle are shown in FIG. 1B.

The ideal current efficiency of the negative charge pump (100) shown in FIG. 1A can be calculated from amount of output charge during the pump period, during which the voltage at the output (108) changes from −0.5*VDD to VNEG, and the amount of charge the capacitors receive from the input (106) during the pre-charge period, during which the serial combination of C1 and C2 is charged by VDD such that the voltage across each capacitor (C1,C2) changes from VNEG to −0.5*VDD.

At pump stage, the amount of electrical charge pumped in to flying capacitors is given by $Q_{pump}$:

$$Q_{pump}=2*C(-0.5*VDD-VNEG)=-2C(0.5*VDD+VNEG).$$

At the end of pumping phase, the voltage, $C_{pump}$, stored across the capacitors is VNEG. To pre-charge $C_1$ and $C_2$ from VNEG to −0.5*VDD will require an amount of electrical charge $Q_p$re:

$$Q\text{pre}=2*0.5C*[-0.5*VDD-VNEG]=-C(0.5VDD+VNEG).$$

The ideal efficiency is $Q_{pump}(Q_{total}+Q_{pump}=Q_{pump}/(Q_{pump}+Q_{pre})$.

The ideal efficiency for this example is thus about 66.6%, or about a 25% improvement over the 50% ideal efficiency typical of the traditional negative charge pumps.

Figure 2:
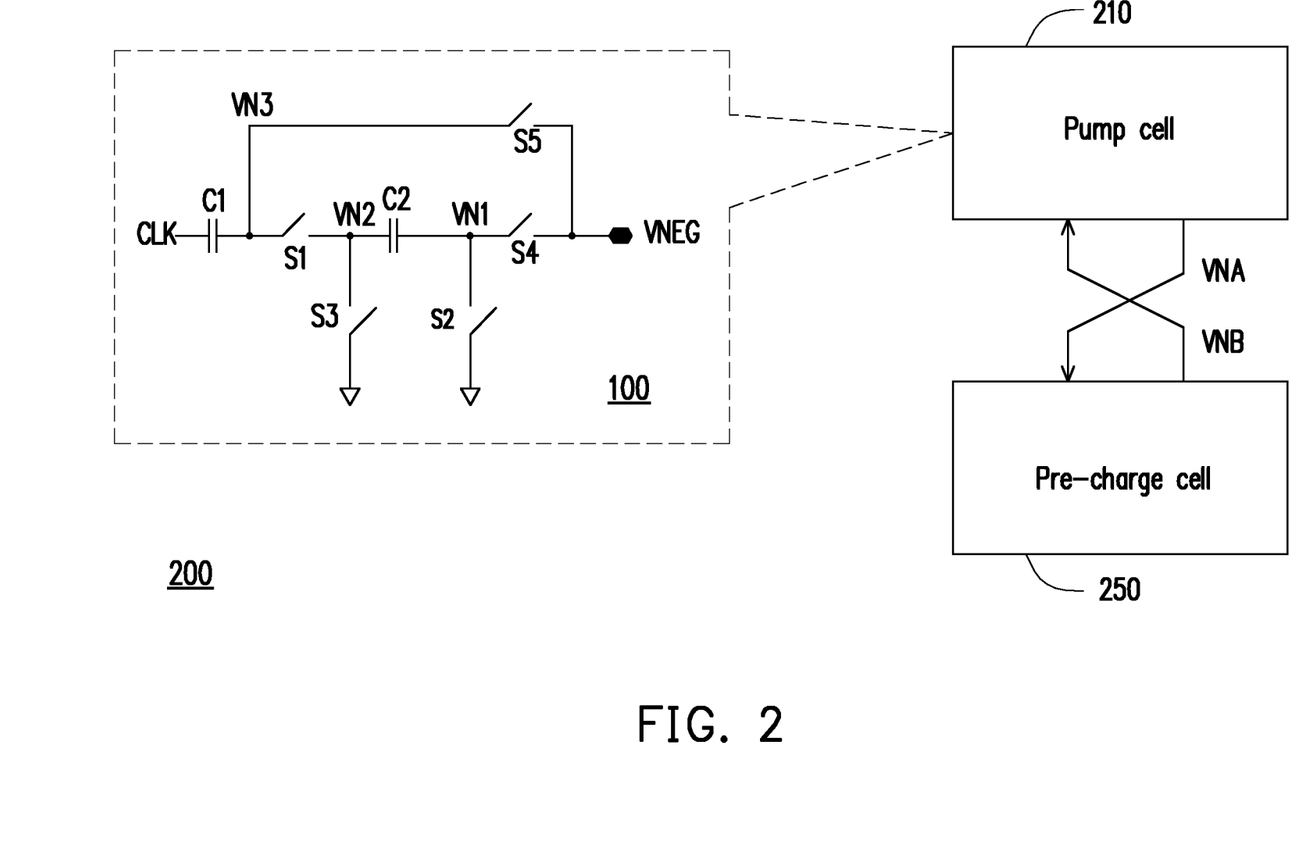
FIG. 2 shows a block diagram of an asymmetric negative charge pump according some embodiments.

The negative charge pump (300), including the switches, can be implemented in a number of ways. In one exemplary embodiment, shown in a block-diagram in FIG. 2, a negative charge pump (200) includes a first cell (pump cell) (210), which includes substantially the negative charge pump (100) shown in FIG. 1A, and a second cell (pre-charge cell) (250), which is configured to charge the flying capacitors in the pump cell (210) during the pre-charge period.

Figure 3A:
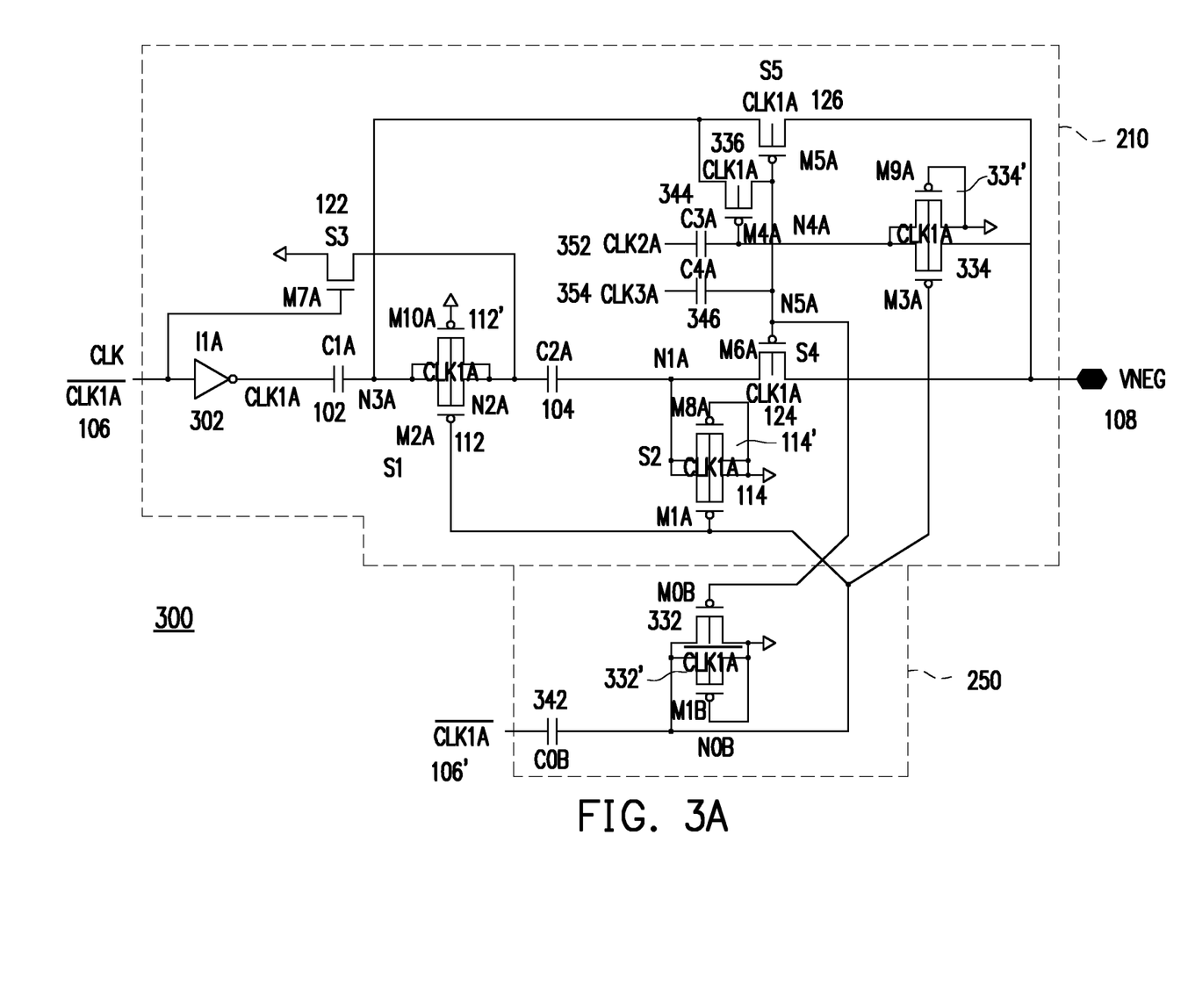
FIG. 3A shows a schematic diagram of an implementation of a negative charge pump according to some embodiments.
Figure 3B:
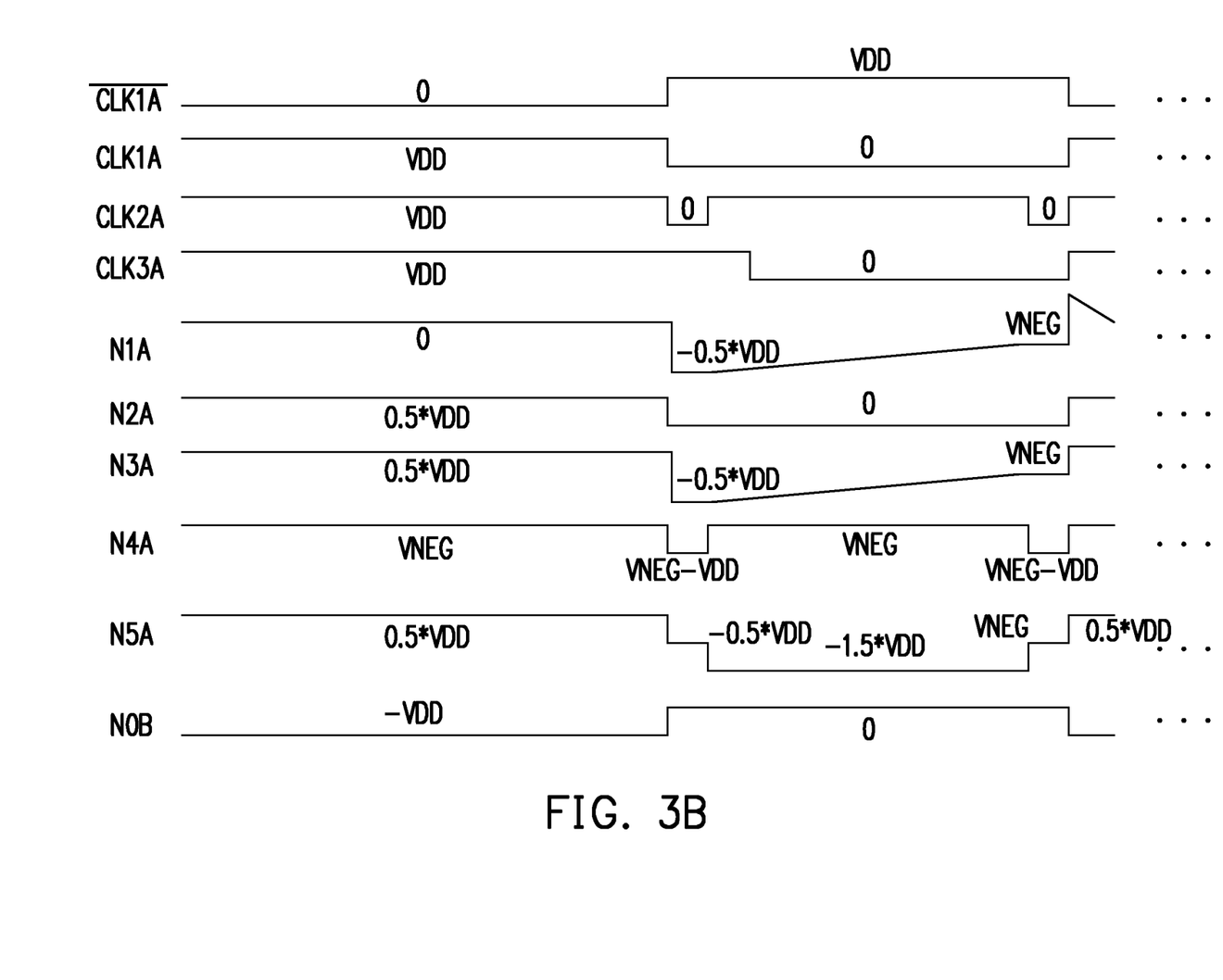
FIG. 3B shows the time progression of various clock pulses and voltages at various points in the negative charge pump shown in FIG. 3A in accordance with some embodiments.

A detailed implementation of the negative charge pump is shown in FIG. 3A, and the various clock pulses and voltages and the various nodes are shown in FIG. 3B.

As shown in FIG. 3A, in the negative charge pump (300), the pump cell (210) includes flying capacitor C1A (102) and C2A (104). The pump cell (210) further includes switches M1A-M7A (114, 112, 334, 336, 126, 124 and 122, respectively). Of these, switches M2A (112), WA (114), M7A (122), M6A (124) and M5A (126) correspond to, respectively, switches S1-S5 in FIG. 1A. The pump cell (210) further includes switches M8A-M10A (114', 334' and 112', respectively) which serve to initialize the switches 114, 334 and 112, respectively. The pump cell (210) employs clock pulses at a number of points. Specifically, a clock pulse signal $\overline{CLK1A}$, which is a complement of a VDD clock pulse signal CLK1A, is applied to the gate of switch M7A (122); $\overline{CLK1A}$ is inverted by an inverter 11A (302), and the resultant clock pulse signal CLK1A is applied to the flying capacitor C1A (102). VDD clock pules signals CLK2A and CLK3A are applied, via switch control capacitors C3A (344) and C4A (346), respectively, to the gate of switch M4A (336) and gates of switches M5A (126) and M5A (124), respectively.

The switches in this example are field effect transistors (FETs), such as metal-oxide-semiconductor field-effect transistors (MOSFETs), but can be any suitable switching devices. In this example, switch transistor M2A (112) has a thick gate oxide—sufficiently thick to prevent break down due to the relatively high voltage across the gate oxide. One implementation of the transistor M2A (112) is a non-deep-n-well dual oxide complementary metal-oxide-semiconductor (non-DNW dual oxide CMOS).

The pre-charge cell (250) in the same example shown in FIG. 3A includes switches M0B (332), M1B (332'), with M0B adapted to turn on and off switches M1A (114), M2A (112) and M3A (334), and M1B initializing switch M0B (332). Clock pulse signal CLK1A is fed to the drain of the switch M0B (332) via a switch control capacitor C0B (342).

Figure 4:
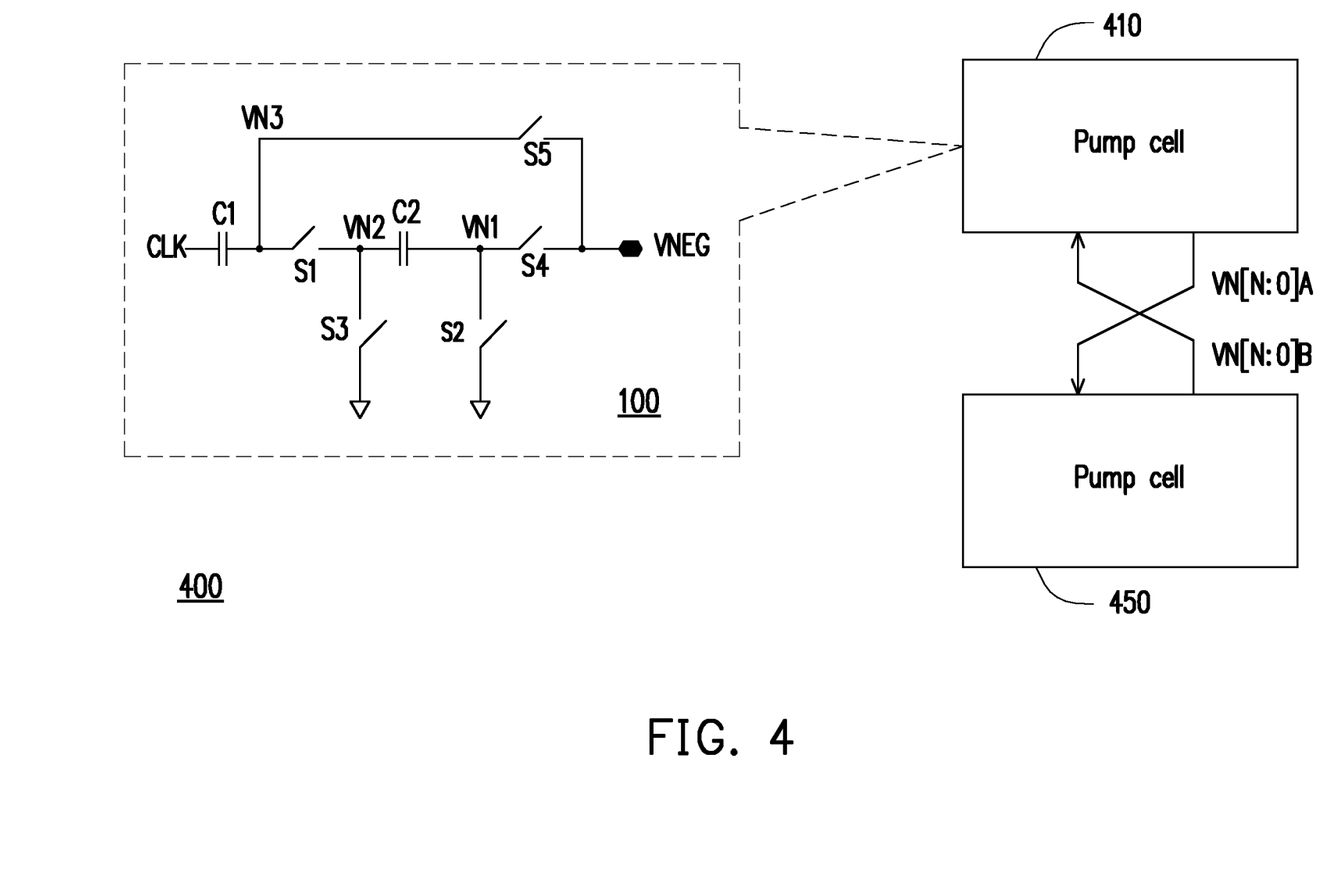
FIG. 4 shows a block diagram of a symmetric negative charge pump according some embodiments.

In operation, the negative charge pump (300) in this example is initialized by the switches M8A-M10A (114', 334' and 112', respectively) and M1B (332'). Specifically, M1B (332') initializes the voltage at the node N0B to the threshold voltage, $V_{th,p}$, of switch M0B (332); M8A (114') initializes the voltage at the node N1A to the threshold voltage, $V_{th,p}$, of switch M1A (114); M9A (334') initializes the voltage at the node N4A to the threshold voltage, $V_{th,p}$, of switch M3A (334); and M10A (112') weakly connects nodes N2A and N3A to each other. Thereafter, the operation of the negative charge pump (300) can be carried out in cycles as indicated by the timing diagrams shown in FIG. 3B, in which, similar to the diagrams in FIG. 1B, the left half the diagrams is the pre-charge period and right half is the pump period. At the end of the pump period, the voltage at node N0B will change from 0 to −VDD; the voltage at node N1A will change from VNEG to 0; the voltage at node N4A will change from VNEG-VDD to VNEG; and node N2A will be solidly connected to node N3A, and voltage at both will be either at CLK1A's high or the voltage of N0B, i.e., −VDD;

In one exemplary embodiment, shown in a block-diagram in FIG. 4, a negative charge pump (400) includes a first cell (pump cell) (410), which includes substantially the negative charge pump (100) shown in FIG. 1A, and a second cell (pump cell) (450), which also includes substantially the negative charge pump (100) shown in FIG. 1A. The two cells are cross-connected so that each cell, during its own pump period, pre-charges the flying capacitors in the other cell.

Figure 5:
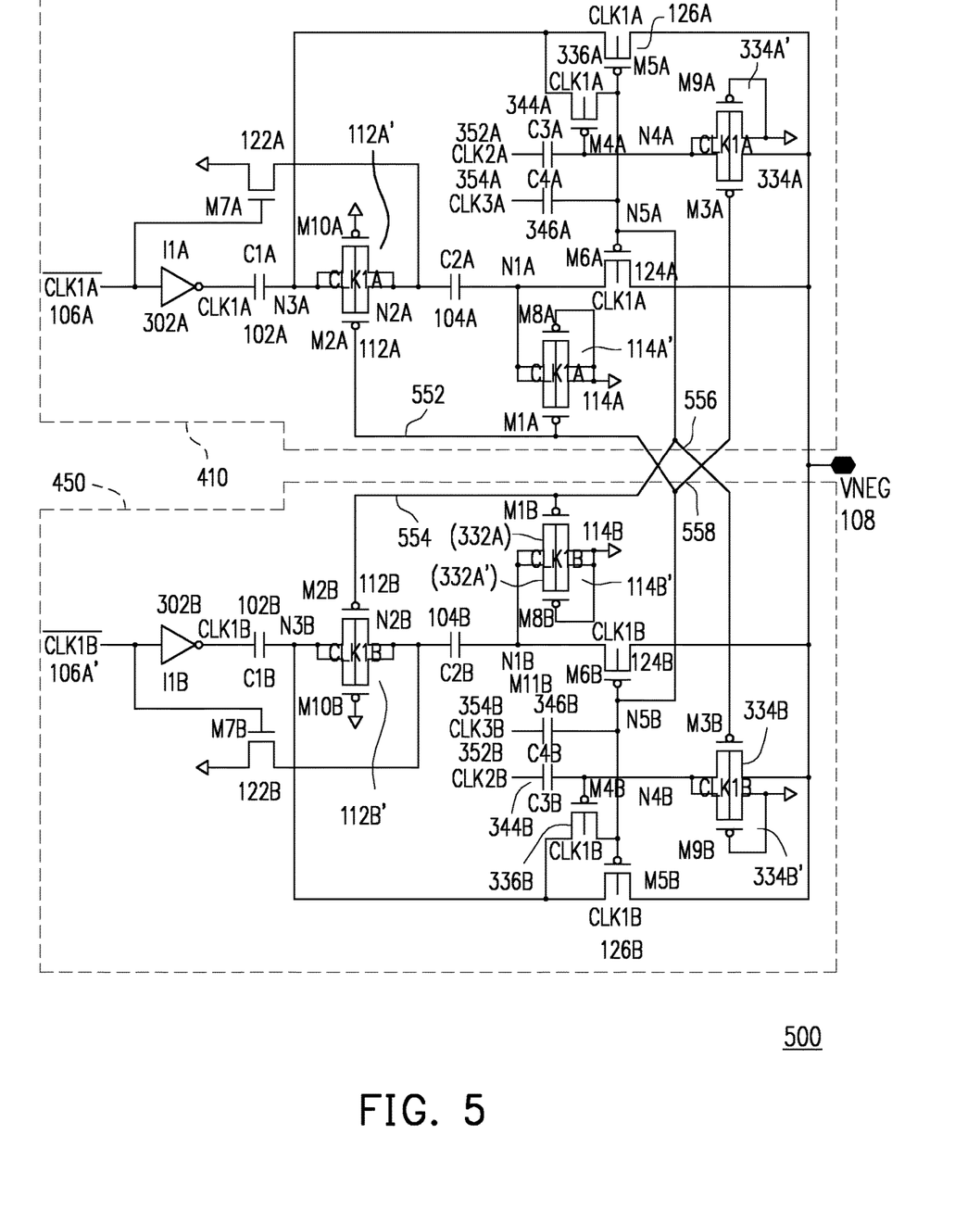
FIG. 5 shows a schematic diagram of a second implementation of a negative charge pump according some embodiments.

Thus, as shown in more detail in FIG. 5, in a negative charge pump 500, the first cell (410) is identical to the pump cell (210) in FIG. 3A; the components of the first cell (410) are therefore labelled to have the same respective numerical labels as those in FIG. 3A, but with the suffix "A" to signify the first cell. The second cell (450) is identical to the first cell (410); the components of the second cell (450) are therefore labelled to have the same respective numerical labels as those in the first cell (410), but with the suffix "B" to signify the second cell.

In the negative charge pump 500, the switch M1B (114B) in the second cell (410) serves as switch S2 for the second cell (450), and switch M8B (114B') is an initialization switch. At the same time, switches M1B and M8B function as the switch pair M0B (332) and M1B (332') in the pre-charging cell (250), respectively, in the negative charge pump (300) shown in FIG. 3A. Similarly, switch M1A (114A) functions both as switch S2 for the first cell (410) and as a part of the pre-charge cell for the second cell (450); switch M8A (114A') is an initializing switch.

The two cells (410, 450) of the negative charge pump (500) are cross-coupled to each other as indicated in FIG. 5. The gates of switches M1A (114A), M2A (112A) and M3A (334A) in the first cell (410) are connected to each other via conductive lines (552, 558, respectively) and connected to node N5B, i.e., the gate of switch M6B (124B) in the second cell (450). Likewise, the gates of switches M1B (114B), M2B (112B) and M3B (334B) in the second cell (450) are connected each other via conductive lines (554, 556, respectively) and connected to node N5A, i.e., the gate of switch M6A (124A) in the second cell (410).

Figure 8:
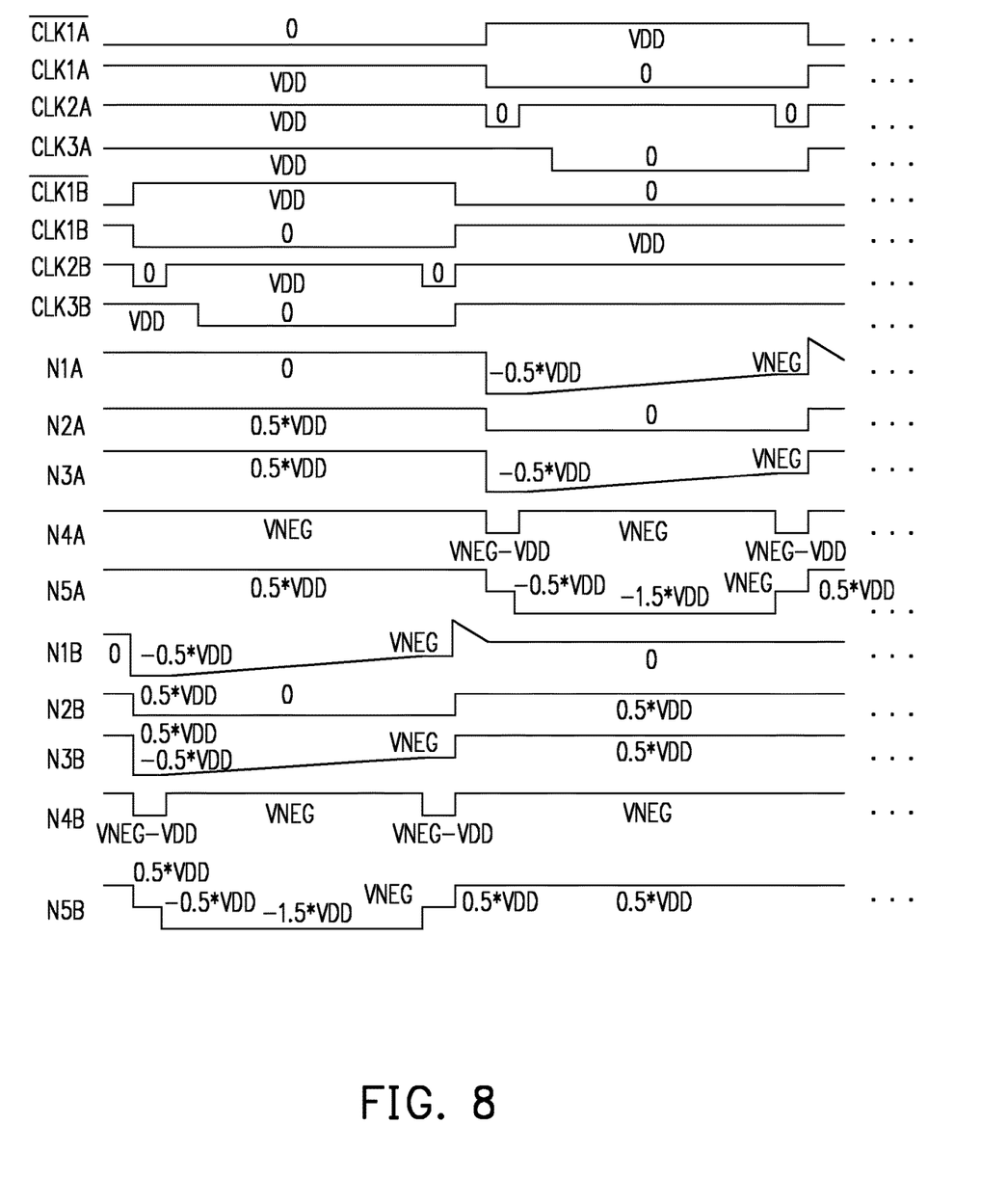
FIG. 8 shows the time progression of various clock pulses and voltages at various points in the negative charge pump shown in FIGS. 5, 6 and 7 in accordance with some embodiments.

As shown in the timing diagrams in FIG. 8, in operation, the clock pulses (CLK1A, CLK1A, CLK2A and CLK3A) for the first cell (410) and those (CLK1B, CLK1B, CLK2B and CLK3B) for the second cell (450) are timed such that when either cell is in the pre-charge state, the other is in the pump state. Thus, at any given moment, pre-charging and pumping take place simultaneously, with the pumping cell at any moment pre-charging the other cell. Moreover, as mentioned above, because components such as switches M1A (114A), M1B (114B), M8A (114A') and M8B (114B') serve dual functions for both cells, the use of duplicative, dedicated pre-charge cell is avoided.

Figure 6:
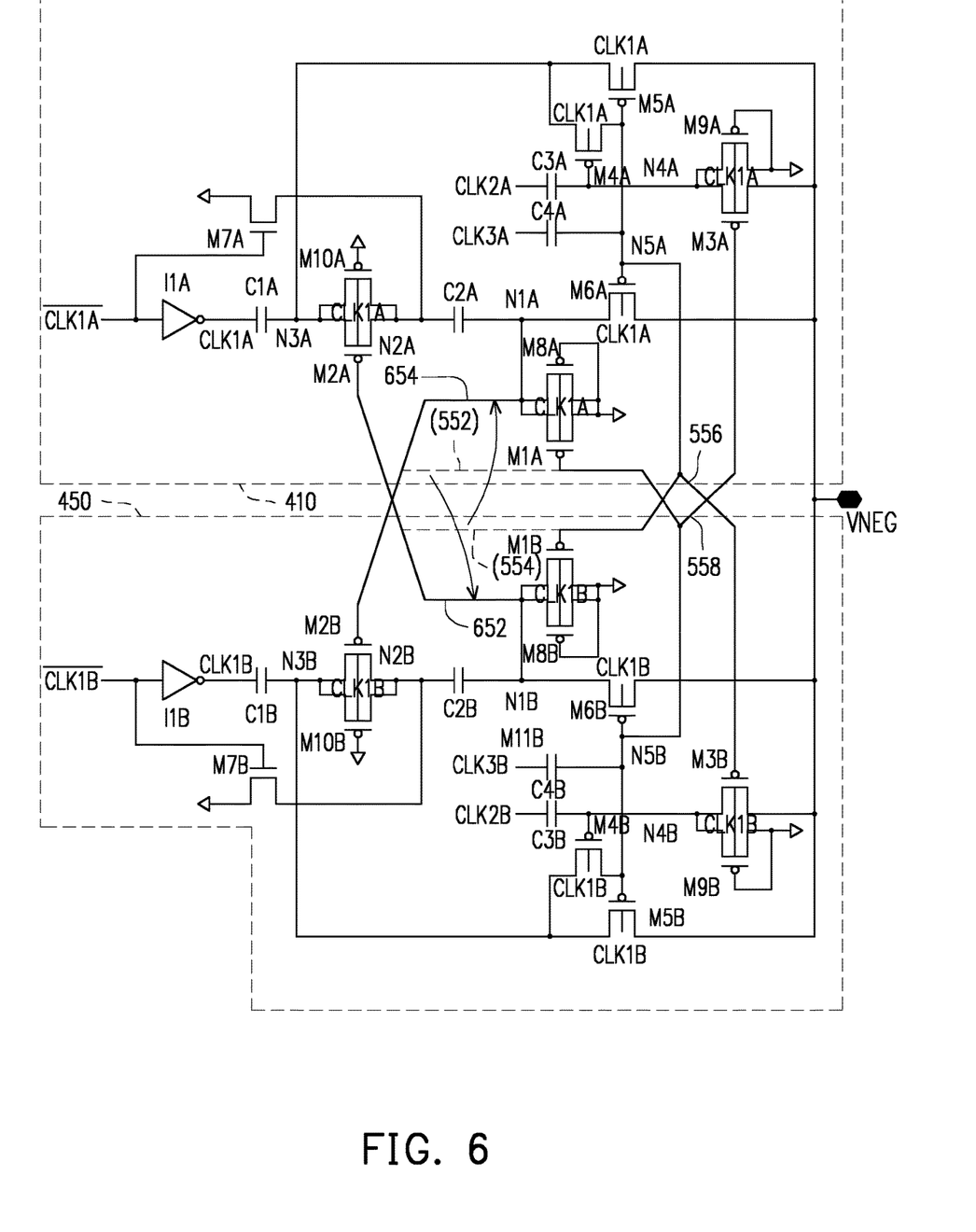
FIG. 6 shows a schematic diagram of a third implementation of a negative charge pump according some embodiments.

Another exemplary implementation of the dual-cell negative charge pump of FIG. 4 is the circuit shown in FIG. 6. The circuit is otherwise identical to that shown in FIG. 5, except that an additional pair of cross-coupling between the first and second cells is provided: The gate of switch M2A, instead of being connected to the gate of switch M1A via line 552) as in FIG. 5, is now connected node N1B; likewise, the gate of switch M2B is connected to node N1A. The clock pulses and voltages at various indicated nodes for this implementation are the same as those for the circuit shown in FIG. 5 and shown in FIG. 8. An advantage of this configuration is that, with an increased number of cross-connections, the voltage drop across the oxide layer of the CMOS devices, such as M2A (112A) and M2B (112B), is reduced to one VDD, which is a thin oxide layer device operation voltage. For example, in FIG. 5, the maximum voltage drop across the oxide layer of M2A (112A) and M2B (112B) is −2*VDD, but in FIG. 6, the maximum voltage drop across the oxide layer of M2A (112A) and M2B (112B) is reduced to −1*VDD. The need for CMOS with a thick oxide (dual oxide) layer can therefore be avoided.

Figure 7:
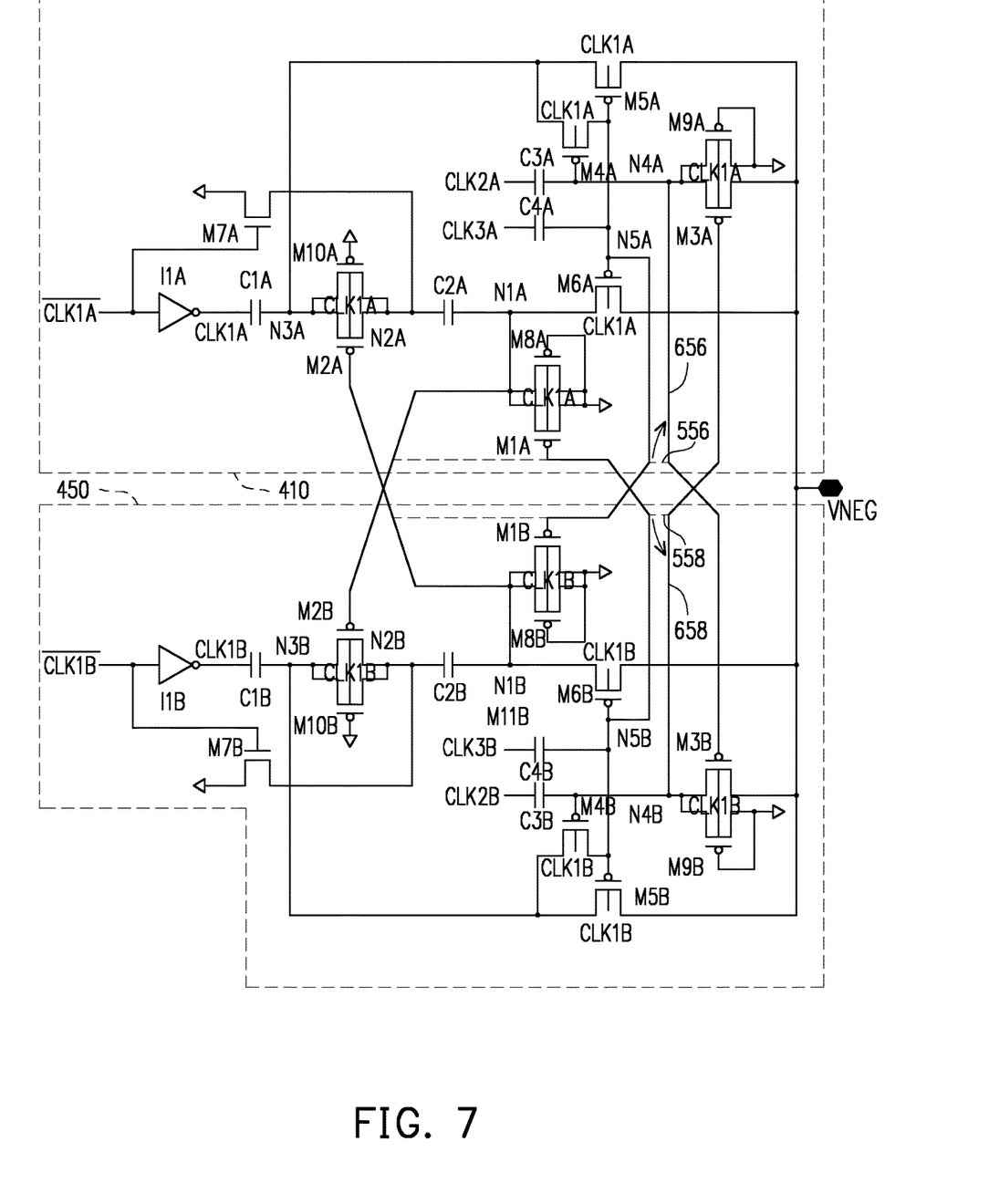
FIG. 7 shows a schematic diagram of a fourth implementation of a negative charge pump according some embodiments.

FIG. 7 shows a further detailed implementation of the negative charge pump shown in FIG. 4. The cells (410, 450) in this implementation have three pairs of cross-connections: In addition to the cross-connections indicated above for the circuits in FIGS. 5 and 6, the gate of the switch M3A, which is connected to the gate of the switch M1A via the conductive line (556) in the circuits in FIGS. 5 and 6, is connected to node N4B via line 658; the gate of the switch M3B, which is connected to the gate of the switch M1B via the conductive line (558) in the circuits in FIGS. 5 and 6, is connected to node N4A via the conductive line (656). The third pair of cross-connections further reduce device loading on N5A and N5B.

Figure 9:
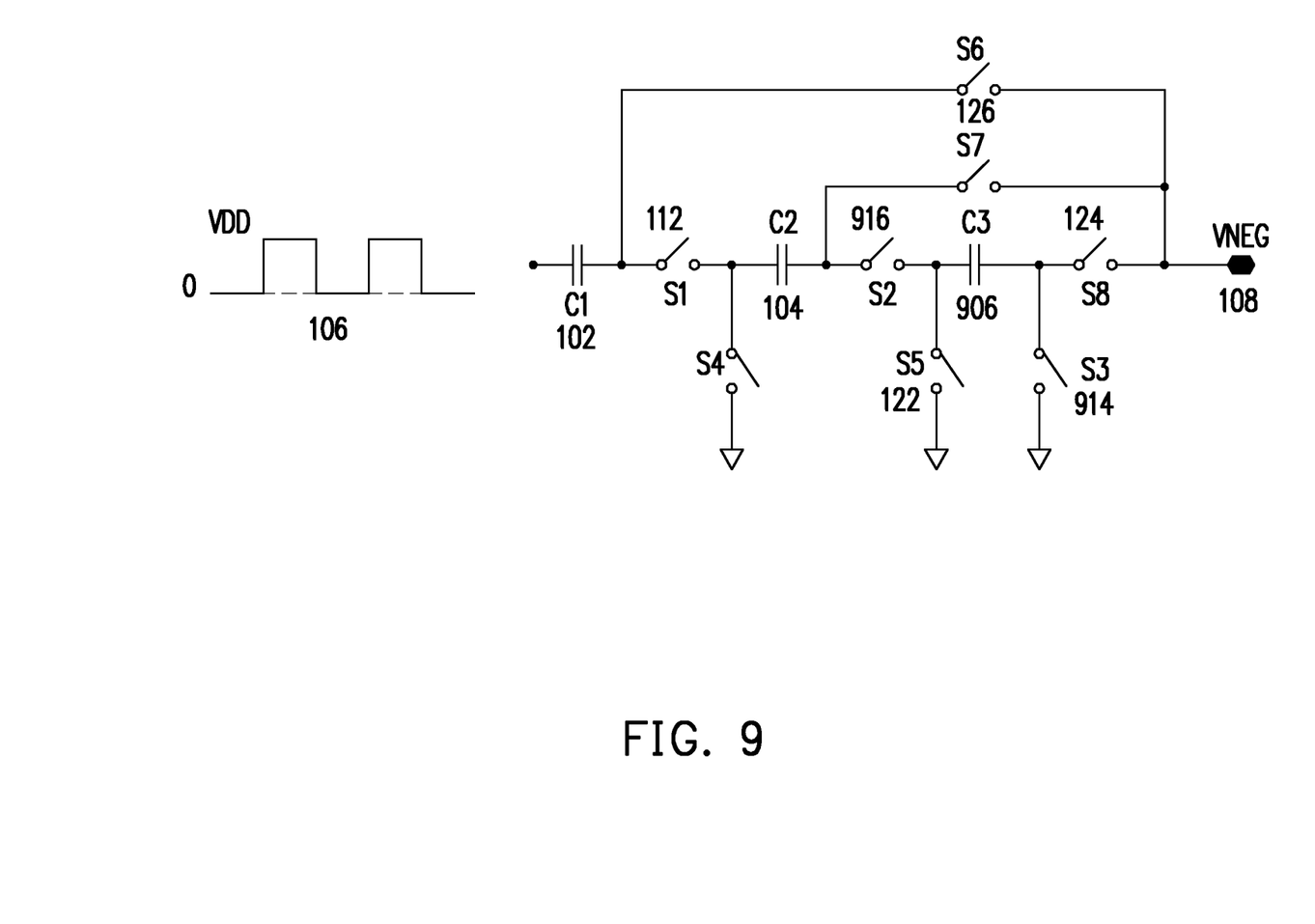
FIG. 9 shows schematically a negative charge pump utilizing three flying capacitors in accordance with some embodiments.

The principles manifested in the embodiments above can be applied to additional applications. As an example, as shown in FIG. 9, a negative charge pump (900) with three flying capacitors C1 (102), C2 (104) and C3 (906) can be inter-connected, in this example by eight switches S1-S8. The capacitors C1 (102), C2 (104) and C3 (906) can be switched from series connection to parallel connection to produce an initial pump voltage of −(⅓)VDD. Provided that VDD is sufficient to provide the required VNEG, such a configuration can be used.

Thus, the embodiments disclosed herein provide negative charge pumps and method with improved current efficiency by switching multiple flying capacitors into configurations of serial or parallel connections during the pre-charge and pump periods, respectively. Cross-linking pairs of negative charge pumps provides added advantage of shared components for pre-charge and pump and possibility of using CMOS devices with reduced oxide thickness.

According to certain embodiments, a negative charge pump includes a network of two or more capacitors, and switches adapted to switch the capacitor network between a serial configuration, in which the capacitors are connected to each other in series, and a parallel configuration, in which the capacitors are connected to each other in parallel. The negative charge pump has an input adapted to receive an input signal having intermittent high- and low levels, and an output. The switches are adapted to switch the capacitor network into the serial configuration when the input signal is high and switch the capacitor network into the parallel configuration when the input signal is low (e.g., zero or ground level).

According to certain other embodiments, a method of converting a positive voltage to a negative voltage includes applying an input signal having intermittent high- (e.g., positive-) and low (e.g., zero or ground) levels to a capacitor network having two or more capacitors; configuring the network into a serial configuration, in which the capacitors are connected to each other in series; charging the capacitors connected in series with the input signal during a pre-charge period, during which the input signal level is high; subsequently, during a pump period, during which the input signal level is low, configuring the network into a parallel configuration, in which the capacitors are connected to each other in parallel; and discharging the capacitors connected in parallel to an output.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:
1. A negative charge pump, comprising:
a first negative charge pump, comprising:

two or more capacitors;
a plurality of switches arranged and adapted to switch the capacitors between a serial configuration, in which the capacitors are connected to each other in series, and a parallel configuration, in which the capacitors are connected to each other in parallel;
an input adapted to receive a first input signal having intermittent high- and low levels; and
an output,
the plurality of switches in the first negative charge pump being arranged and adapted to, in a pre-charge state, switch the capacitors into the serial configuration when the first input signal is at the high level, and, in a pump state, switch the capacitors into the parallel configuration connected to the output when the first input signal is at the low level; and
a second negative charge pump, comprising:
two or more capacitors;
a plurality of switches arranged and adapted to switch the capacitors between a serial configuration, in which the capacitors are connected to each other in series, and a parallel configuration, in which the capacitors are connected to each other in parallel, wherein one or more of the plurality of switches of the second charge pump are the one or more switches arranged and adapted to cause at least one of the plurality of switches of the first negative charge pump to change between being conducting and non-conducting;
an input adapted to receive a second input signal having intermittent high- and low levels; and
an output,
the switches being arranged and adapted to, in a pre-charge state, switch the capacitors into the serial configuration when the second input signal is at the high level and, in a pump state, switch the capacitors into the parallel configuration connected to the output when the second input signal is at the low level.

2. The negative charge pump of claim 1, further comprising:
a first clock signal source adapted to provide a first clock signal, wherein the input of the first negative charge pump is adapted to receive the first clock signal as the first input signal; and
a second clock signal source adapted to provide a second clock signal, wherein the input of the second negative charge pump is adapted to receive the second clock signal as the second input signal.

3. The negative charge pump of claim 1, wherein:
the plurality of switches in the first negative charge pumps are arranged and adapted to produce at the output of first negative charge pump a voltage of a level below the low level of the first input signal;
the plurality of switches in the second negative charge pumps are arranged and adapted to produce at the output of second negative charge pump a voltage of a level below the low level of the second input signal.

4. The negative charge pump of claim 3, wherein the switches in each of the first and second negative charge pumps are arranged and adapted to produce at the respective output a voltage having a magnitude of half or less of the magnitude of the high level of the respective input signal.

5. The negative charge pump of claim 1, wherein
the two or more capacitors in each of the first and second negative charge pumps comprise a first capacitor having a first end and a second end, and the second capacitor having a first and second end,
wherein the respective input is connected to the first end of the first capacitor, and
wherein the switches are arranged and adapted to,
for the serial connection, connect the second end of the first capacitor to the first end of the second capacitor, and connect the second end of the second capacitor to a voltage reference point, and
for the parallel connection, connect the second ends of the first and second capacitors to the respective output, connect the first end of the second capacitor to the reference voltage, disconnect the second end of the first capacitor from the first end of the second capacitor and disconnect the second end of the second capacitor from the voltage reference point.

6. The negative charge pump of claim 5, wherein the plurality of switches in each of the first and second negative charge pumps comprise:
a first switch connected between the second end of the first capacitor and the first end of the second capacitor;
a second switch connected between the second end of the second capacitor and the voltage reference point;
a third switch connected between the junction between the first switch and first end of the second capacitor, and the voltage reference point;
a fourth switch connected between the junction between the second end of the second capacitor and the voltage reference point, and the respective output; and
a fifth switch connected between the second end of the first capacitor and the respective output.

7. The negative charge pump of claim 6, wherein the first and second switches in each of the first and second negative charge pumps are adapted to be conducting when the respective input signal is at the high level, and non-conducting when the respective input signal is at the low level, and wherein the third, fourth and fifth switches are adapted to be non-conducting when the respective input signal is at the high level, and conducting when the respective input signal is at the low level.

8. The negative charge pump of claim 2, wherein:
one or more of the plurality of switches in the first negative charge pump are arranged and adapted to cause at least one of the plurality of switches in the second negative charge pump to change between conducting and non-conducting; and
one or more of the plurality of switches in the second negative charge pump are arranged and adapted to cause at least one of the plurality of switches in the first negative charge pump to change between conducting and non-conducting.

9. The negative charge pump of claim 1, wherein one or more of the plurality of switches of the first charge pump are arranged and adapted to cause at least one of the plurality of switches of the second negative charge pump to change between being conducting and non-conducting.

10. The negative charge pump of claim 1, wherein the output of the first and second negative charge pumps are directly connected to each other.

11. The negative charge pump of claim 1, wherein the second negative charge is adapted to operate in the pump state when the first negative charge pump operates in the pre-charge state, and to operate in the pre-charge state when the first negative charge pump operates in the pump state.

12. The negative charge pump of claim 2, wherein each of the plurality of switches in each of the first and second negative charge pumps comprises a transistor having a control electrode and two current-carrying electrodes, wherein the control electrode is adapted to set the conduction state between the current-carrying electrodes.

13. The negative charge pump of claim 1, wherein each of the plurality of switches of each of the first and second negative charge pumps comprises a transistor having a control electrode and two current-carrying electrodes, wherein the control electrode is adapted to set the conduction state between the current-carrying electrodes,
wherein each of the first and second negative charge pumps comprises a plurality of nodes where at least two of the capacitors and switches in the negative charge pump are directly connected to each other, and
wherein the control electrodes of at least two of the plurality of transistors of each negative charge pump is connected to respective nodes in the other negative charge pump.

14. The negative charge pump of claim 2, wherein the two or more capacitors in each of the first and second negative charge pumps comprise at least three capacitors.

15. A negative charge pump system, comprising at least two negative charge pumps, each of the negative charge pumps comprising:
two or more capacitors;
a plurality of switch transistors arranged and adapted to switch the capacitors between a serial configuration, in which the capacitors are connected to each other in series, and a parallel configuration, in which the capacitors are connected to each other in parallel;
an input adapted to receive an input signal having intermittent high- and low levels; and
an output,
the switch transistors being arranged and adapted to, in a pre-charge state, switch the capacitor network into the serial configuration when the input signal is at the high level, and, in a pump state, switch the switch the capacitor network into the parallel configuration connected to the output when the input signal is at the low level,
wherein at least one of the plurality of transistors in each negative charge pump is connected to one of the plurality of transistors of the other negative charge pump and adapted to control the conduction state of the transistor.

16. The negative charge pump system of claim 15, wherein each of the plurality of transistors of each negative charge pump comprises a control electrode and two current-carrying electrodes, wherein the control electrode of at least one of the plurality of transistors in one of the negative charge pumps is connected to one of the plurality of transistors in the other one of the negative charge pumps.

17. The negative charge pump system of claim 16, wherein each of the plurality of transistors of each negative charge pump comprises a metal-oxide-semiconductor field-effect transistor (MOSFET) having a gate oxide layer having a thickness, wherein the gate oxide layers in all of the MOSFETs have substantially the same thickness.

18. The negative charge pump system of claim 16, wherein each of the first and second negative charge pump negative charge pumps comprises a plurality of nodes where at least two of the capacitors and switch transistors in the negative charge pump are directly connected to each other, and
wherein the control electrodes of at least two of the plurality of transistors of each negative charge pump is connected to respective nodes in the other negative charge pump.

* * * * *

UNITED STATES PATENT AND TRADEMARK OFFICE
CERTIFICATE OF CORRECTION

PATENT NO. : 10,541,606 B1
APPLICATION NO. : 16/220006
DATED : January 21, 2020
INVENTOR(S) : Chang et al.

Page 1 of 1

It is certified that error appears in the above-identified patent and that said Letters Patent is hereby corrected as shown below:

On the Title Page

Item (57) Abstract, Line 10: "switch the switch the" should read --switch the--

In the Specification

Column 3, Line 50: "The ideal efficiency is $Q_{pump}(Q_{total}+Q_{pump}=Q_{pump}/(Q_{pump}+Q_{pre}))$." should read --The ideal efficiency is $Q_{pump}/Q_{total}=Q_{pump}/(Q_{pump}+Q_{pre})$.--

Column 4, Line 12: "by an inverter 11A (302)," should read --by an inverter I1A (302),--

Column 4, Line 32: "pulse signal CLK1A is fed" should read --pulse signal $\overline{CLK1A}$ is fed--

Column 5, Lines-29-30: "clock pulses (CLK1A, CLK1A, CLK2A and CLK3A) for the first cell (410) and those (CLK1B, CLK1B, CLK2B" should read --clock pulses ($\overline{CLK1A}$, CLK1A, CLK2A and CLK3A) for the first cell (410) and those ($\overline{CLK1B}$, CLK1B, CLK2B--

In the Claims

Column 10, Line 1, Claim 15: "switch the switch the" should read --switch the--

Signed and Sealed this
First Day of December, 2020

Andrei Iancu
*Director of the United States Patent and Trademark Office*